United States Patent
Henriksson et al.

(10) Patent No.: US 10,863,453 B2
(45) Date of Patent: Dec. 8, 2020

(54) PRS POWER PATTERN

(71) Applicant: Telefonaktiebolaget LM Ericsson (publ), Stockholm (SE)

(72) Inventors: Daniel Henriksson, Linköping (SE); Andreas Borg, Rimforsa (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/465,181

(22) PCT Filed: Feb. 14, 2017

(86) PCT No.: PCT/EP2017/053271
§ 371 (c)(1),
(2) Date: May 30, 2019

(87) PCT Pub. No.: WO2018/149481
PCT Pub. Date: Aug. 23, 2018

(65) Prior Publication Data
US 2019/0373564 A1    Dec. 5, 2019

(51) Int. Cl.
*H04W 52/14*    (2009.01)
*H04W 52/32*    (2009.01)
(Continued)

(52) U.S. Cl.
CPC ....... *H04W 52/325* (2013.01); *H04W 52/243* (2013.01); *H04W 52/367* (2013.01)

(58) Field of Classification Search
CPC ............. H04W 52/325; H04W 52/243; H04W 52/367
(Continued)

(56) References Cited

U.S. PATENT DOCUMENTS 8,660,072 B2 *  2/2014  Siomina ............... G01S 1/24
                                                     370/329
8,982,788 B2 *  3/2015  Han ................. H04L 5/0053
                                                     370/328

(Continued)

FOREIGN PATENT DOCUMENTS

KR     20160057336 A    5/2016

OTHER PUBLICATIONS

Nextnav et al., "New Work Item Proposal: Further Indoor Positioning Enhancements for UTRA and LTE", 3GPP TSG RAN Meeting #71, Göteborg, Sweden, Mar. 7, 2016, pp. 1-9, RP-160538, 3GPP.

(Continued)

*Primary Examiner* — Hai V Nguyen
(74) *Attorney, Agent, or Firm* — Coats & Bennett, PLLC

(57) ABSTRACT

Methods and apparatus for estimating a location of a user equipment (UE) (102) in a wireless communication system (100) are presented. For instance, in an example method performed by a UE (102), the UE (102) can receive positioning reference signals (PRSs) transmitted by multiple cells, where a cell of the multiple cells transmits a series of PRSs according to a transmission power pattern (112). The transmission power pattern (112) defines a transmission power for each PRS of the series, the transmission power for each PRS of the series being part of a non-binary set of allowable transmission powers. The example method may also include generating PRS measurement data (114) for the UE (102) based on the received PRSs. Methods and apparatuses related to the UE example above are provided for a positioning server (108) and network node (106).

20 Claims, 9 Drawing Sheets

(51) Int. Cl.
*H04W 52/24* (2009.01)
*H04W 52/36* (2009.01)

(58) Field of Classification Search
USPC .................................................. 455/522, 69
See application file for complete search history.

(56) References Cited

U.S. PATENT DOCUMENTS

| | | | |
|---|---|---|---|
| 9,203,583 B2 | 12/2015 | Siomina et al. | |
| 9,215,054 B2* | 12/2015 | Han | H04L 27/2602 |
| 9,398,480 B2* | 7/2016 | Siomina | H04J 11/005 |
| 9,503,216 B2* | 11/2016 | Siomina | H04W 24/10 |
| 9,705,719 B2* | 7/2017 | Han | H04L 5/0053 |
| 9,709,664 B2* | 7/2017 | Persson | G01S 5/10 |
| 9,961,660 B2* | 5/2018 | Harris | G01S 5/0236 |
| 9,986,572 B2* | 5/2018 | Kim | H04L 5/0057 |
| 10,194,265 B2* | 1/2019 | Edge | G01S 5/10 |
| 10,219,238 B2* | 2/2019 | Abdi | H04L 5/0048 |
| 10,285,153 B2* | 5/2019 | Kim | H04W 64/00 |
| 10,317,509 B2* | 6/2019 | Fischer | H04W 72/042 |
| 10,411,930 B2* | 9/2019 | Han | H04L 5/005 |
| 10,469,226 B2* | 11/2019 | Kim | H04W 4/022 |
| 2009/0312008 A1* | 12/2009 | Lindoff | H04L 25/0224 |
| | | | 455/423 |
| 2010/0317343 A1* | 12/2010 | Krishnamurthy | H04W 24/10 |
| | | | 455/435.1 |
| 2011/0176499 A1* | 7/2011 | Siomina | H04L 5/0091 |
| | | | 370/329 |
| 2012/0027110 A1* | 2/2012 | Han | H04L 27/2613 |
| | | | 375/260 |
| 2012/0165053 A1* | 6/2012 | Yoon | H04L 5/0048 |
| | | | 455/501 |
| 2013/0040673 A1* | 2/2013 | Siomina | H04W 64/00 |
| | | | 455/501 |
| 2014/0126403 A1* | 5/2014 | Siomina | H04J 11/005 |
| | | | 370/252 |
| 2014/0128115 A1* | 5/2014 | Siomina | H04W 24/10 |
| | | | 455/501 |
| 2015/0063195 A1* | 3/2015 | Han | H04L 5/0007 |
| | | | 370/312 |
| 2015/0203213 A1* | 7/2015 | Levien | H04L 63/14 |
| | | | 701/486 |
| 2015/0223185 A1* | 8/2015 | Harris | H04W 48/20 |
| | | | 455/456.5 |
| 2015/0237523 A1* | 8/2015 | Chun | H04L 5/00 |
| | | | 370/252 |
| 2015/0333884 A1* | 11/2015 | Athley | H04B 7/0617 |
| | | | 375/295 |
| 2016/0043887 A1* | 2/2016 | Han | H04L 27/2607 |
| | | | 370/312 |
| 2016/0135143 A1* | 5/2016 | Won | H04W 72/005 |
| | | | 370/312 |
| 2016/0182203 A1* | 6/2016 | Fang | H04W 72/04 |
| | | | 370/329 |
| 2016/0291128 A1* | 10/2016 | Persson | H04W 4/023 |
| 2016/0316445 A1* | 10/2016 | Abdi | H04W 24/10 |
| 2016/0374136 A1* | 12/2016 | Moisio | H04W 28/0236 |
| 2017/0188371 A1* | 6/2017 | Kim | H04W 52/243 |
| 2017/0257242 A1* | 9/2017 | Han | H04L 27/2675 |
| 2017/0285132 A1* | 10/2017 | Fischer | G01S 5/0226 |
| 2017/0288830 A1* | 10/2017 | Fischer | G01S 5/0252 |
| 2017/0318554 A1* | 11/2017 | Kim | G01S 1/20 |
| 2017/0339516 A1* | 11/2017 | Edge | H04W 48/12 |
| 2018/0294934 A1* | 10/2018 | Kim | H04L 5/0053 |
| 2019/0182007 A1* | 6/2019 | Liu | H04L 5/003 |

OTHER PUBLICATIONS

Ericsson, "Revised WID for Further Enhanced MTC for LTE", 3GPP TSG RAN Meeting #73, New Orleans, USA, Sep. 19, 2016, pp. 1-6, RP-161464, 3GPP.

Huawei et al., "Revised Work Item Proposal: Enhancements of NB-IoT", 3GPP TSG RAN Meeting #73, New Orleans, USA, Sep. 19, 2016, pp. 1-8, RP-161901, 3GPP.

3rd Generation Partnership Project, "3rd Generation Partnership Project; Technical Specification Group Radio Access Network; Evolved Universal Terrestrial Radio Access (E-UTRA); LTE Positioning Protocol A (LPPa) (Release 14)", Technical Specification, 3GPP TS 36.455 V14.0.0, Jan. 1, 2017, pp. 1-67, 3GPP.

3rd Generation Partnership Project, "3rd Generation Partnership Project; Technical Specification Group Core Network and Terminals; Location Services (LCS); LCS Application Protocol (LCS-AP) Between the Mobile Management Entity (MME) and Evolved Serving Mobile Location Centre (E-SMLC); SLs Interface (Release 14)", Technical Specification, 3GPP TS 29.171 V14.0.0, Dec. 1, 2016, pp. 1-54, 3GPP.

3rd Generation Partnership Project, "3rd Generation Partnership Project; Technical Specification Group Core Network and Terminals; Location Services (LCS); Evolved Packet Core (EPC) LCS Protocol (ELP) Between the Gateway Mobile Location Centre (GMLC) and the Mobile Management Entity (MME); SLg Interface (Release 13)", Technical Specification, 3GPP TS 29.172 V13.1.0, Jun. 1, 2016, pp. 1-40, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.1.0, Dec. 1, 2016, pp. 1-654, 3GPP.

3rd Generation Partnership Project, "3rd Generation Partnership Project; Technical Specification Group Radio Access Network; Evolved Universal Terrestrial Radio Access (E-UTRA); LTE Positioning Protocol (LPP) (Release 14)", Technical Specification, 3GPP TS 36.355 V14.0.0, Dec. 1, 2016, pp. 1-151, 3GPP.

3rd Generation Partnership Project, "3rd Generation Partnership Project; Technical Specification Group Services and System Aspects; Functional Stage 2 Description of Location Services (LCS) (Release 14)", Technical Specification, 3GPP TS 23.271 V14.0.0, Dec. 1, 2016, pp. 1-180, 3GPP.

* cited by examiner

PRS POWER PATTERN

TECHNICAL FIELD

The application relates to systems, methods, and apparatus for providing positioning reference signals (PRSs) to one or more user equipment (UE), and in particular, utilizing a transmission power pattern for providing the PRSs.

BACKGROUND

In existing wireless communication systems, such as Long Term Evolution (LTE) networks, a geographic position of a UE is determined by analyzing PRSs transmitted in various cells of the system. Specifically, in some existing systems, the UEs in the system receive the PRSs of the various cells, generate certain data based on the received PRSs, and transmit that generated data to a positioning server (e.g., using the LTE Positioning Protocol (LPP)) via nodes in the wireless communication system (e.g., eNodeB (eNB), Mobility Management Entity (MME), etc.). In turn, the positioning server processes the data to determine a geographic location of the UE from which the data was received, and may communicate this determined location to one or more other devices, including the UE in appropriate circumstances.

The veracity of the determined location in such systems depends to a high degree on the quality of the accuracy of the underlying data generated by the UE itself, and correspondingly, the nature of the PRSs transmitted in the various cells. In certain LTE systems the data generated by the UE may indicate an Observed Time Difference of Arrival (OTDOA) associated with one or more of the received PRSs. When OTDOA is utilized, a UE estimates the difference between the times that different PRSs of particular cells are received at the UE. In other words, OTDOA is a UE-assisted method, in which the UE measures the time of arrival (TOA) of specific PRSs from multiple cells (i.e., transmitted by eNBs associated with these cells), and computes the differences in arrival times. These reference signal time differences (RSTD) are quantized and reported via LPP to the positioning server (e.g., Evolved Serving Mobile Location Centre (E-SMLC)), and can sometimes be transmitted together with an accuracy assessment. Based on the RSTD, known positions of the cells or associated eNBs and the time synchronization in the system, the positioning server estimates the geographic position of the UE.

However, in some circumstances, some received PRSs may be improperly interpreted by the UE (e.g., due to interference from concurrent intra-cell or inter-cell transmissions) or certain PRSs may not be received by the UE at all (e.g., due to signal obfuscation from buildings or other physical structures in the communication environment). In these situations, RSTD information generated by the UE may be incorrect or incomplete, and can therefore have a negative impact on the validity of the location estimate generated by the positioning server. In a specific example, a UE may generate incorrect RSTD information when different cells share the same Physical Cell Identity (PCI), which is used by the UE to identify the associated source cell of the PRS. In such cases, a UE may receive different PRSs from these different cells that share a PCI, but may be unable to decipher which of the different cells is the actual source of each of the received PRSs. Similarly, if a UE is to measure PRSs of a first cell with a particular PCI, but the PRSs of the first cell are blocked (e.g., at an indoor location or in a dense urban environment), the UE may erroneously regard the PRSs transmitted by a second cell with the same PCI as the first cell as having originated from the first cell. As the first cell and second cell are uniquely located, the resulting UE location information determined by the positioning server can be incorrect.

As such discrepancies in the RSTD information can have a significant impact on the ultimate location estimate, techniques for improving the accuracy of the RSTD information have been previously attempted. In one such technique that attempts to reduce the interference with neighbor cells in a PRS subframe, no application/payload/user data (e.g., data typically transmitted over a shared data channel, such as the Physical Downlink Shared Channel (PDSCH)) is contemporaneously transmitted with the PRSs. Accordingly, intra-cell and inter-cell interference between PRS transmissions and the application/payload/user data transmissions is avoided.

In another existing solution, transmission of PRSs is muted (e.g., no transmission at all or a faint transmission at a near-zero power level) according to a periodic, repeating PRS muting pattern for each cell. According to the PRS muting implementation, certain PRS transmission occasions in a periodic, repeating set of PRS transmissions are muted according to the muting pattern of the cell. As a result, concurrent PRS transmissions from multiple cells that would have otherwise caused interference (i.e., cells sharing a transmission frequency or utilizing a similar cyclic shift value) are able to be separated in the time domain through application of disparate muting patterns. Accordingly, the use of PRS muting patterns lessens the potential for interference in neighbor cells throughout a wireless communication system.

The beneficial aspects of PRS muting pattern implementation come at a cost, however. Specifically, when a PRS is muted, no PRS is available for use by those UEs that would not have experienced interference—even if the PRS were to be transmitted. In other words, though PRS muting may reduce interference experienced by a first UE at a particular location, there can be a performance cost for a second UE at a different location that would have experienced no interference had the PRS been transmitted.

Therefore, to address the issues described above, improved techniques for PRS communication in wireless communication systems are needed.

SUMMARY

The present disclosure describes example embodiments for UE location estimation based on PRSs transmitted using a PRS transmission power pattern. For instance, an example method executed by a UE in a wireless communication system is described, whereby the UE receives PRSs transmitted by multiple cells. In an aspect, a cell of these multiple cells transmits a series of PRSs according to a transmission power pattern defining a transmission power for each PRS of the series. The transmission power for each PRS of the series is part of a non-binary set of allowable transmission powers. The method further includes the UE generating PRS measurement data for the UE based on the received PRSs. A UE for performing this and related example methods is also described.

In one embodiment, such a UE in a wireless communication system comprises communication circuitry and processing circuitry. Thereby the UE is configured to receive positioning reference signals transmitted by multiple cells. A cell of the multiple cells transmits a series of PRSs according to a transmission power pattern defining a transmission power for each PRS of the series. The transmission power for each PRS of the series are part of a non-binary set of allowable transmission powers. Thereby the UE is also configured to generate PRS measurement data for the UE based on the received PRSs.

In another embodiment, such a UE in a wireless communication system is configured to receive PRSs transmitted by multiple cells. A cell of the multiple cells transmits a series of PRSs according to a transmission power pattern defining a transmission power for each PRS of the series. The transmission power for each PRS of the series are part of a non-binary set of allowable transmission powers. The UE is configured to generate PRS measurement data for the UE based on the received PRSs.

In another embodiment, such a UE in a wireless communication system comprises a receiving module configured to receive PRSs transmitted by multiple cells. A cell of the multiple cells transmits a series of PRSs according to a transmission power pattern defining a transmission power for each PRS of the series. The transmission power for each PRS of the series are part of a non-binary set of allowable transmission powers. The UE comprises a generating module configured to generate PRS measurement data for the UE based on the received PRSs.

The disclosure also provides an example method executed by a positioning server for estimating a location of a UE in a wireless communication system. In an aspect, the example method includes receiving, from the UE, PRS measurement data generated by the UE based on PRSs transmitted by multiple cells. In an aspect, a cell of the multiple cells transmits a series of PRSs according to a transmission power pattern defining a transmission power for each PRS of the series. Also, the transmission power for each PRS of the series is part of a non-binary set of allowable transmission powers. Furthermore, the example method includes estimating, based on the received PRS measurement data, the location of the UE. A positioning server for performing this and related example methods is also described.

In one embodiment, such a positioning server configured to estimate a location of a UE in a wireless communication system comprises communication circuitry and processing circuitry. Thereby, the positioning server is configured to receive, from the UE, PRS measurement data generated by the UE based on PRSs transmitted by multiple cells. A cell of the multiple cells transmits a series of PRSs according to a transmission power pattern defining a transmission power for each PRS of the series. The transmission power for each PRS of the series are part of a non-binary set of allowable transmission powers. Thereby, the positioning server is configured to estimate, based on the received PRS measurement data, the location of the UE.

In another embodiment, such a positioning server configured to estimate a location of a UE in a wireless communication system is being configured to receive, from the UE, PRS measurement data generated by the UE based on PRSs transmitted by multiple cells. A cell of the multiple cells transmits a series of PRSs according to a transmission power pattern defining a transmission power for each PRS of the series. The transmission power for each PRS of the series are part of a non-binary set of allowable transmission powers. The positioning server is configured to estimate, based on the received PRS measurement data, the location of the UE.

In another embodiment, such a positioning server configured to estimate a location of a UE in a wireless communication system comprises a receiving module configured to receive, from the UE, PRS measurement data generated by the UE based on PRSs transmitted by multiple cells. A cell of the multiple cells transmits a series of PRSs according to a transmission power pattern defining a transmission power for each PRS of the series. The transmission power for each PRS of the series are part of a non-binary set of allowable transmission powers. The positioning server comprises an estimating module configured to estimate, based on the received PRS measurement data, the location of the UE.

Additionally, the disclosure describes an example method executed by a network node for managing transmission of PRSs in a cell to a UE in a wireless communication system. For example, the method includes obtaining, for the cell, a transmission power pattern defining a transmission power for each PRS of the series. The transmission power for each PRS of the series is selected from a non-binary set of allowable transmission powers. Furthermore, the example method includes transmitting the series of PRSs to the UE according to the transmission power pattern. A network node for performing this and related example methods is also described.

In one embodiment, such a network node for managing transmission of PRSs in a cell to a UE in a wireless communication system comprises communication circuitry and processing circuitry. Thereby the network node is configured to obtain, for the cell, a transmission power pattern defining a transmission power for each PRS of the series. The transmission power for each PRS of the series is selected from a non-binary set of allowable transmission powers. Thereby, the network node is configured to transmit the series of PRSs to the UE according to the transmission power pattern.

In another embodiment, a network node for managing transmission of PRSs in a cell to a UE in a wireless communication system is configured to obtain, for the cell, a transmission power pattern defining a transmission power for each PRS of the series. The transmission power for each PRS of the series is selected from a non-binary set of allowable transmission powers. The network node is configured to transmit the series of PRSs to the UE according to the transmission power pattern.

In another embodiment, such a network node for managing transmission of PRSs in a cell to a UE in a wireless communication system comprises an obtaining module configured to obtain, for the cell, a transmission power pattern defining a transmission power for each PRS of the series. The transmission power for each PRS of the series is selected from a non-binary set of allowable transmission powers. The network node comprises a transmitting module configured to transmit the series of PRSs to the UE according to the transmission power pattern.

The disclosure also provides an example computer program comprising instructions. The instructions, when executed on at least one processor of a device (such as a UE, a positioning server, or a network node) cause the device to carry out any one the above example methods.

The disclosure also provides an example carrier which comprises the above described example computer program. The carrier comprises one of an electronic signal, optical signal, radio signal, or computer readable storage medium.

DETAILED DESCRIPTION

The present disclosure describes example techniques for optimizing PRS transmission in wireless communication networks by utilizing a PRS transmission power pattern for each cell. For any given cell, this transmission power pattern defines a repeated series of transmission power level values that are to be utilized for a corresponding series of PRS transmissions for the cell. In some examples, the transmission power level values that define a transmission power pattern can be selected (e.g., by a network node such as an eNodeB and/or a positioning server) from a discrete set of allowed transmission power values from zero power to a maximum allowable transmission power value for the cell and/or system. Hence, the transmission powers of each PRB are selected from a non-binary set of allowable transmission powers. In other words, the non-binary set of allowable transmission powers comprises more than two allowable values. Therefore, the techniques described herein allow cells to select a PRS transmission power value for each of one or more PRS occasions in a repeated series of PRS occasions (i.e., for any singular PRS transmission instance, or "occasion," in a series of "occasions" that is repeated in time) to minimize any risk of interference in the cell itself or with neighboring cells, and without completely muting PRSs such that they can be utilized by other UEs not experiencing any interference problems.

As such, utilization of the presently described techniques helps to mitigate the drawbacks of utilizing existing PRS muting patterns, while still providing the advantages of current PRS muting pattern, such as reduced PRS interference in neighbor cells. In addition, the interference reductions and improved measurement quality associated with the use of a PRS power pattern can also lead to an overall greater location accuracy for location determinations.

Figure 1:
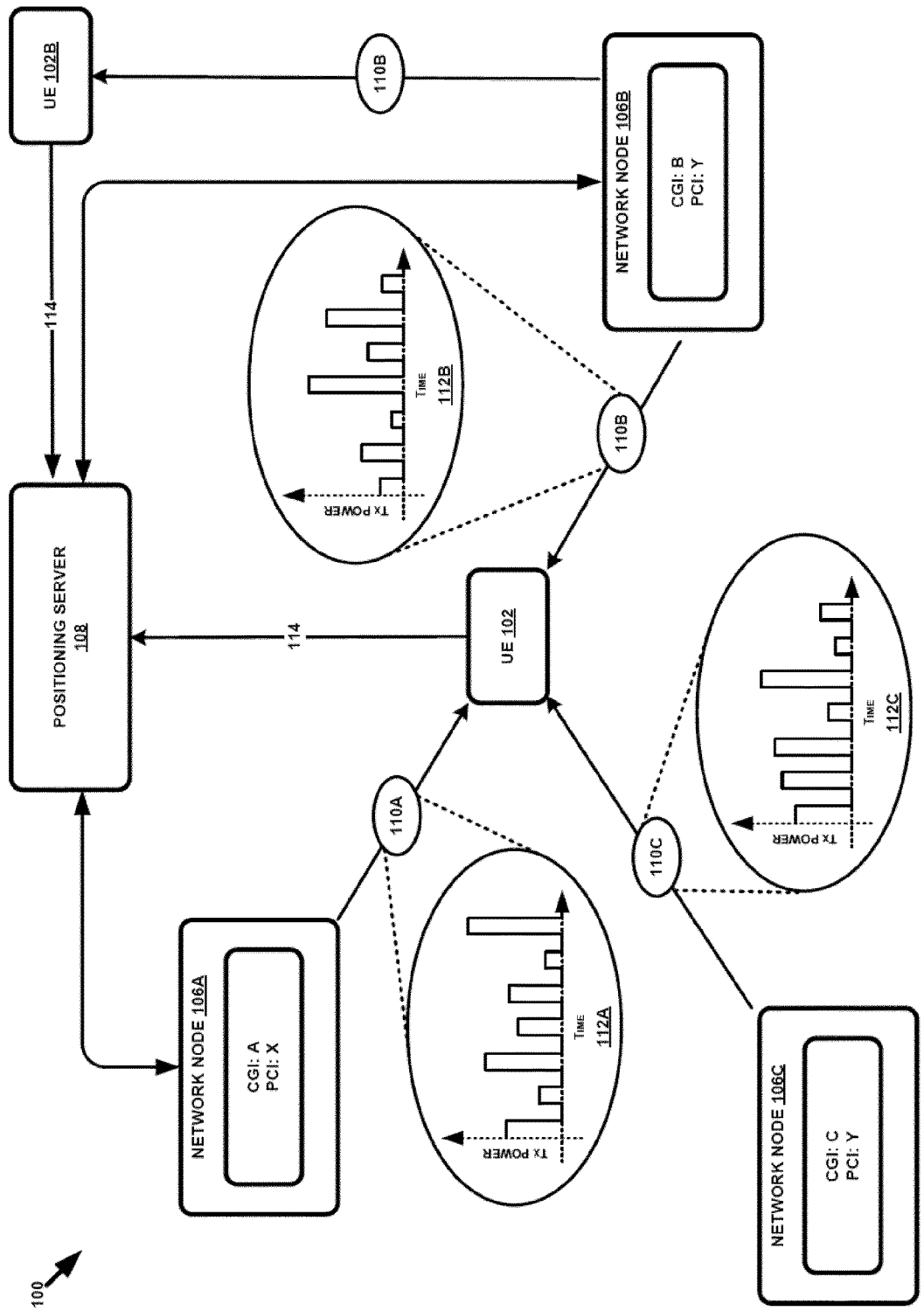
FIG. 1 illustrates a wireless communication system corresponding to example embodiments of the present disclosure.

FIG. 1 illustrates an example wireless communication system 100 comprising a UE 102 (for example UE 102A and UE 102B), network nodes 106 (including network node instances 106A, 106B, and 106C), and a positioning server 108, which together may perform techniques described herein to determine a geographical location or position of UE 102 based in part on different PRS transmission power patterns 112 associated with different cells of network nodes 106. Each of these transmission power patterns 112 define a power that is utilized by a network node 106 (e.g., eNodeB, NodeB, Access Point (AP), base station, or other network-side device) to transmit each of a periodically repeated series of PRSs 110. As can be seen in FIG. 1, for instance, each network node 106 transmits PRSs 110 according to a unique PRS transmission power pattern 112, as the transmission power levels defining transmission power patterns 112A, 112B, and 112C are unique. It should be noted that although each network node 106 is associated with a single PRS power pattern 112 and series of PRSs 110, this is not an exclusive scenario for implementation of the present techniques. Instead, each network node 106 may provide a plurality of cells, with each cell transmitting different PRSs according to different PRS transmission power patterns 112. The use of a single PRS transmission power pattern 112 for each network node 106 in FIG. 1 and any other figures is for clarity and simplicity. In any event, the PRS transmission power patterns 112 comprise a defined series of transmission power levels.

In an aspect, the positioning server 108 is configured to estimate or otherwise determine a location (otherwise referred to herein as "position information" or "location information" or simply as "position" or "location") associated with at least UE 102, for instance, by utilizing PRS measurement data 114 obtained from UE 102 and other pertinent location data, such as known geographic locations of the network nodes 106 (which may be stored at the positioning server 108 or on a separate server or separate data storage device or separate data storage medium). For example, the PRS measurement data 114 may comprise information indicating a time at which certain PRSs were received by the UE 102 and may identify the source cell (or network node 106) associated with each time of arrival (TOA). In some instances, such as those where the system 100 utilizes OTDOA for positioning determination, the PRS measurement data 114 may include differences in arrival times between one or more PRSs received from a particular cell and those of another cell or cells. In these cases, the UE 102 may quantize this reference signal time difference (RSTD) information itself before transmitting it to the positioning server 108 (e.g., via LTE Positioning Protocol (LPP) for UE location determination. In some examples, the UE 102 can perform an accuracy assessment of the quantized RSTD information (e.g., based on received signal power of the PRSs, UE or cell location, or other factors known in the art), and may report the results of the accuracy assessment to the positioning server 108 along with the RSTD information.

Additionally or alternatively, the PRS measurement data 114 may comprise information about the particular power levels at which certain PRSs were received by the UE 102 and the identifying information of the source cell (or network node 106) associated with each power level reading. In some instances, such as when multiple cells from which PRSs are received at UE 102 share a PCI or other identifying or characteristic information, this power level information may be utilized by the positioning server 108 to identify which of the multiple cells was the source cell of a particular PRS transmission. Specifically, the positioning server 108 is configured to compare the received power levels of one or more PRSs (or the power level difference between consecutive PRS receptions) to PRS transmission power patterns 112 utilized by network nodes 106 for transmitting PRSs 110 of a particular cell. Accordingly, based on these comparisons, the positioning server 108 can identify a single source cell of a plurality of potential source cells for one or more PRS transmissions received by the UE 102 and thus prevent the erroneous UE location determinations of existing solutions by recognizing the PRS reception data is associated with a different cell than intended for a particular measurement. In other words, in addition to limiting the potential for PRS interference in system 100, utilization of the PRS transmission power patterns 112 described herein can also serve as an identifier for a cell in cases where other identifying information (e.g., Cell Global Identify (CGI), PCI) is insufficient to determine the true source of one or more PRS transmissions.

This cell identification aspect is illustrated in FIG. 1. As shown, a first cell provided by network node 106A has a CGI of "A" and a PCI of "X." Second and third cells are provided by network nodes 106B and 106C, respectively, and have CGIs of "B" and "C" respectively. However, given that a finite number of unique PCIs are available for cell identification, the second and third cells have been assigned a same PCI, namely "Y." The UE 102 is configured to generate the PRS measurement data 114 by tuning its wireless communication components (e.g., transceiver circuitry and antenna(s)) to certain frequencies at certain times known to the UE 102. For instance, before tuning transceiver circuitry to receive certain PRSs, the UE 102 may receive a request to provide PRS measurement data 114 associated with certain cells to the positioning server 108. The request can further comprise assistance data (AD), which is information indicating the particular cells for which PRS measurement is necessary to determine the UE position at the positioning server 108. In some examples, the AD comprises the CGI/PCI of the one or more cells whose PRSs are to be measured by the UE 102.

In an aspect of the present disclosure, in addition to CGI and/or PCI information, this AD can indicate one or more PRS transmission power patterns 112 corresponding to the particular cells for which PRSs are to be measured by the UE 102. In certain examples, the UE 102 can utilize the PRS transmission power patterns 112 to verify the true identity of the source cell that transmitted a series of received PRSs. For instance, in FIG. 1, UE 102 receives different series of PRSs from two different cells, namely, the second and third cells with a shared PCI of "Y." If the UE 102 and/or positioning server 108 were to rely on PCI alone to determine a source cell for one or more PRSs received at the UE 102, PRSs from the second cell may be misidentified as those of the third cell, or vice versa. However, by comparing the PRS transmission power patterns 112B and/or 112C to a received series of PRSs, the UE 102 and/or positioning server 108 of the present disclosure can better determine a true source cell for any given PRS series, and thus reduce instances of improper location determinations in the system 100 due to incorrect identifications. This aspect is further explained below in reference to FIG. 3.

In an example implementation scenario, the generation of the transmission power pattern 112 for a particular cell may initially be performed by the network node 106 managing the cell. For example, at the establishment of a cell, at cell restart, upon waking a cell up from an inactive or idle state, or at any other instance (e.g., periodically, upon the expiration of a time, or based on a regeneration command from the positioning server 108), the network node 106 may generate a transmission power pattern 112 to be initially utilized by the cell by generating a random sequence of transmission power values 112 that each correspond to a PRS transmission instance in a sequence of PRS transmission to be conducted by the cell via the network node 106. In some instances, the network node 106 determines an initial set of allowed transmission power values based on a stored startup configuration, for instance, programmed into memory at the network node 106 by a manufacturer or operator. This configuration may alternatively be transferred to the network node 106 from another network device, network data storage, server, the core network, or potentially from one or more UEs 102 as the cell powers on and begins receiving probe requests from the one or more UEs 102 within range of the cell. In other instances in which the cell was previously in operation but entered a state (e.g., sleep, idle, low power, or powered down state) during which PRSs are not transmitted, the network node 106 may resume a most recently used PRS transmission pattern 112 as an initial PRS transmission pattern 112 when the cell resumes transmission of PRSs in the system 100.

Furthermore, in some embodiments, the PRS transmission power patterns 112 used by a particular network node 106 may be altered by a controlling device, such as, but not limited to, the positioning server 108. For instance, taking the positioning server 108 as said controlling device as an example, the network nodes 106 of FIG. 1 may be configured to report to the positioning server 108, at certain times, the PRS transmission power pattern 112 being utilized by the network node 106. These certain times may include after an initial PRS transmission or set of transmissions (i.e. at power-up or restart of a cell or the network node 106, generally) or time that is based on a schedule of periodic PRS transmission power pattern reporting agreed upon between the positioning server 108 and the network nodes 106. This reporting and relevant reporting times, in some examples, may be negotiated between the positioning server 108 and the network nodes 106 (individually or as a group) or may be preconfigured in a memory of the network node 106.

After receiving one or more PRS transmission power patterns 112, the positioning server 108 may store them each in memory. In some examples, the stored PRS transmission power patterns 112 may be referenced by the positioning server 108 to verify an identity of a particular cell who transmitted PRSs referenced in PRS measurement data 114 received by a UE 102. As described above, this allows the positioning server 108 to verify, based on the known PRS transmission power pattern 112 of a cell, whether the PRS measurement data 114 is accurate regarding source cells for received PRSs.

In addition, the positioning server 108 is configured to determine whether each of the one or more PRS transmission power patterns 112 should be altered to optimize the performance of the system 100 as a whole. For instance, in some examples, the positioning server 108 may determine that, based on the locations of the one or more cells and/or a approximate location of one or more UEs 102 in the system 100, that the PRS transmission power pattern 112 of certain cells could be further optimized such that a greater number of UEs are able to receive PRSs. Based on such a determination, the positioning server 108 may generate an updated PRS transmission power pattern and send it to the appropriate network node 106. In some examples, the positioning server 108 can potentially also transmit the updated PRS transmission power pattern to other network nodes 106, as well, such that other network nodes 106 are aware of the PRS transmission power pattern 112 of all (or some) of its neighbor cells.

In addition, in some examples, network nodes 106 can indicate to one or more of its UEs 102 at least the PRS transmission power patterns 112 of one or more of its own managed cells and potentially that of other cells not under its control. The positioning server 108 may do the same, and may inform the UEs 102 of all cells of the system 100 or a subset thereof of a current PRS transmission power pattern 112 in use by the cells, an updated PRS transmission power pattern (if applicable), or any other relevant information, which may be realized through additional data in AD or in a standalone message.

By providing the UEs 102 with the PRS transmission power pattern(s) 112 of these cells, the UEs 102 can, after receiving one or more PRSs or series of PRSs from certain cells, perform cell identification and verification functions instead of the positioning server 108. One advantage of this UE-based identification and verification technique is a reduction in system overhead. Specifically, as discussed above, to perform these identification and verification functions, the received power level data obtained by the UE 102 while receiving PRS is compared to the known PRS transmission power patterns of relevant cells to determine a likelihood that a source cell is indeed the cell for which measurement data is desired. Accordingly, for embodiments in which cell verification is performed at the positioning server 108, the received PRS power information generated at the UE 102 must be transmitted across the network in addition to relevant TOA data, for instance as PRS measurement data 114. If the cell identification and verification are instead performed at the UE 102, communication of the received PRS power information in the PRS measurement data 114 is not required, thus lessening the payload of the PRS measurement data messages and freeing up system resources for other message transmission, as well as reducing the time necessary to perform the overall UE location estimation procedure as a whole.

Figure 2:
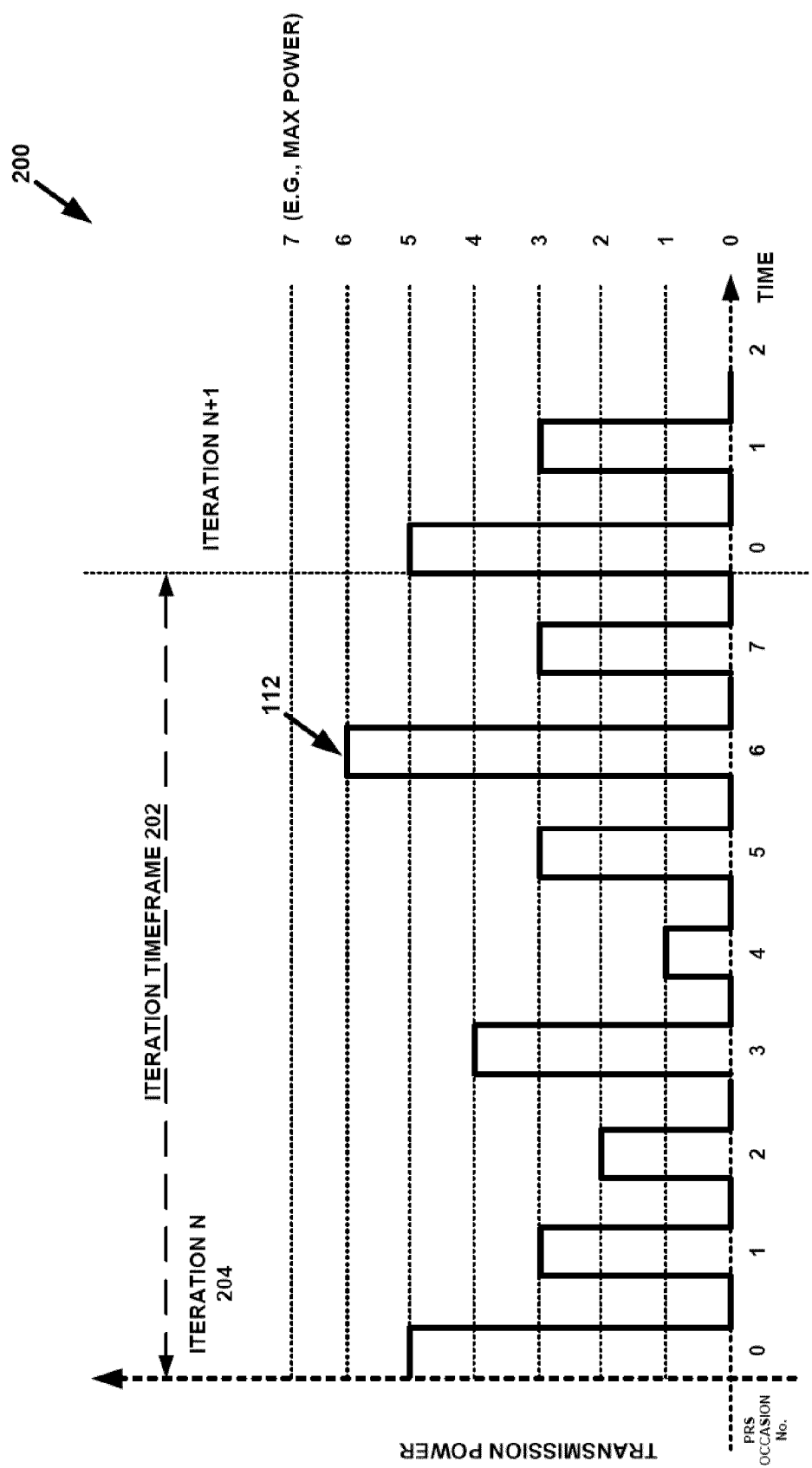
FIG. 2 illustrates an example PRS transmission power pattern according to one or more embodiments.

As introduced above, the present disclosure describes techniques for addressing inter-cell PRS interference and mistaken cell identity problems during UE location estimation by utilizing different PRS transmission power patterns for different cells. FIG. 2 illustrates a transmission signal diagram 200 showing an example of such a PRS transmission power pattern 112 that can be utilized by a network node 106 during UE location estimation in a wireless communication system 100. As is shown in the figure, a PRS transmission pattern 112 is represented as a time-varying transmission power waveform defining a plurality of individual PRS transmission occasions (PRS occasion numbers 0-7 in FIG. 2) that each make up an iteration 204 of the repeated PRS transmission pattern 112.

As shown in the non-limiting embodiment of FIG. 2, an iteration N of the PRS transmission power pattern consists of 8 individual PRS transmission occasions (may be referred to herein as simply "occasions"), numbered 0-7, respectively. In an aspect, each of the individual occasions 0-7 may occur in series (i.e. in an order) at regular intervals within the iteration timeframe. Furthermore, although the example presented in FIG. 2 shows 8 PRS occasions in the iteration timeframe 202, any number of PRS iterations 204 may be included in a given iteration (e.g., 2, 4, 8, 16, 32, 64, or any other integer). In some instances, this number of iterations 204 may depend, at least in part, on a periodicity of the iterations 204, frequency at which the iterations are to repeat, transmission time interval (TTI), and/or any other time-related parameter associated with the repetition of the series of PRS iterations in an iteration. These parameters may be provided to a UE 102 by the positioning server 108 and/or network node 106 (e.g., in assistance data or system information blocks) to ensure consistent timing across cells.

In an aspect of the present disclosure, each PRS occasion has an associated transmission power level (y-axis). These transmission power levels, taken together along with their order in the sequence of PRS occasions, define that PRS transmission power pattern 112. For instance, consider the PRS transmission power pattern 112 illustrated in FIG. 2. As shown, the PRS occasions 0-7 are each transmitted at a particular transmission power of a set of allowable transmission powers whose values are each marked by a horizontal dotted line. These allowable transmission powers may be set by a network operator, a network node 106 itself, positioning server 108, or any other network-side device or entity. In some example, the allowable transmission power levels may be preconfigured in network nodes 106 of the system such that these allowable transmission powers are known and usable for PRS transmission before the transmissions actually occur.

In some examples of PRS transmission power pattern 112, each of the allowable transmission power values may be equally spaced across a realizable transmission power spectrum. In FIG. 2, this realizable transmission power spectrum stretches from zero power (no power, 0) to a maximum realizable power of the transmitting network node 106 (max power 7, measured in arbitrary units). The allowable transmission powers can be identified explicitly (e.g., when preconfigured or obtained from another network device such as positioning server 108. In alternative (or additional) embodiments, the allowable transmission powers may be identified based on a number of allowable transmission powers (e.g., defined by the network operator, positioning server 108, or any other network device) and the maximum realizable power, and specifically by placing the allowable transmission powers such that they are equally spaced across the spectrum. An example of these allowable transmission power values is shown in FIG. 2 as the dotted horizontal lines (representing, in the example, 8 unique and equally spaced power levels). As shown in the figure, the maximum transmission power realizable by the network node 106 (or permitted by the system) and zero power (no power, 0) are included in the set of allowable transmission powers, although one or both of these values may not be included in some embodiments. Furthermore, the set of allowable transmission powers are non-binary, which for purposes of the present disclosure, means that the set of allowable transmission powers comprises more than two allowable values.

Figure 3:
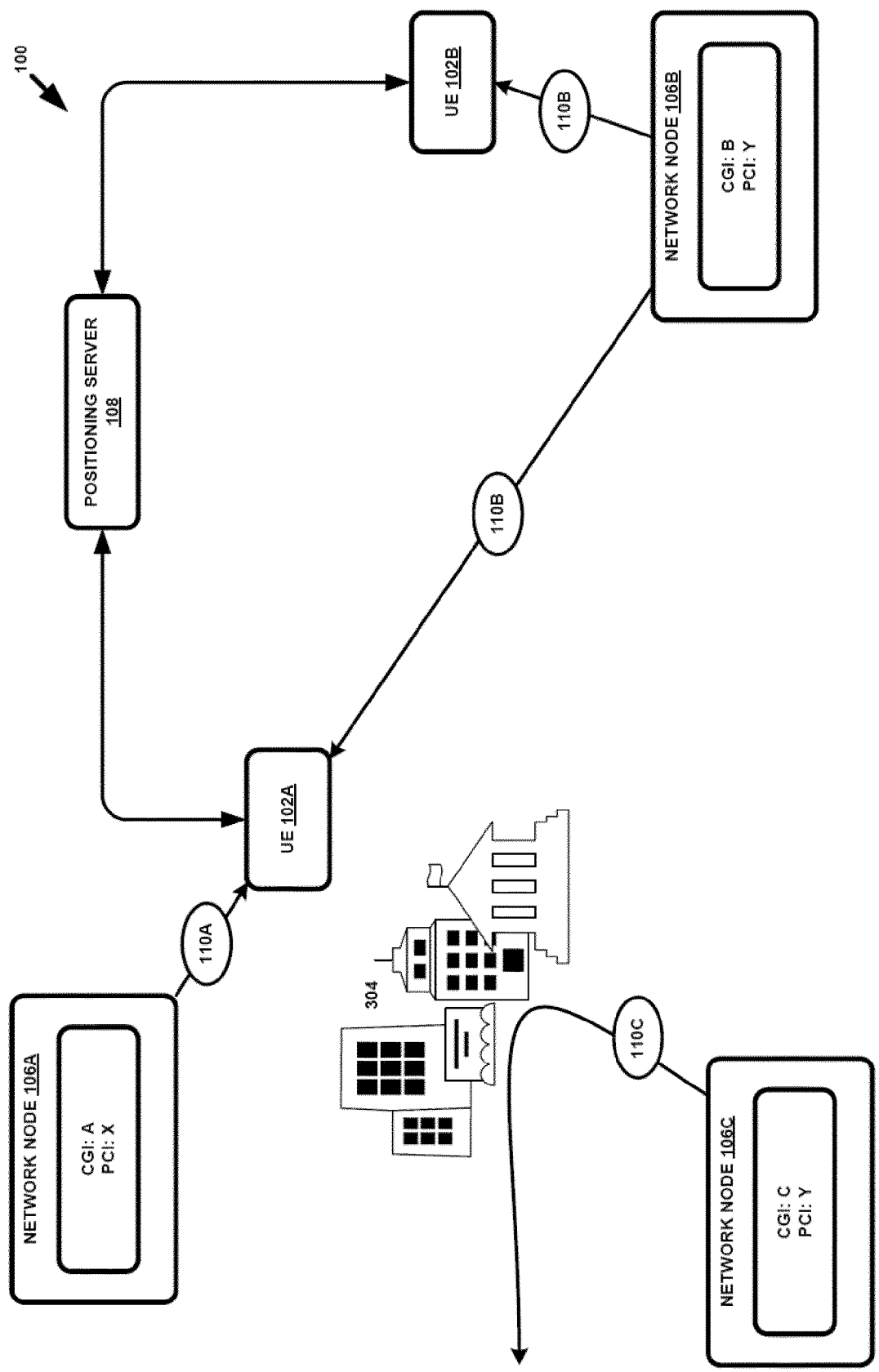
FIG. 3 illustrates an example implementation scenario in the wireless communication system corresponding to embodiments of the present disclosure.

As explained above, each of one or more cells of the system 100 may periodically transmit its own PRS series defined by its own PRS transmission power pattern 112. In doing so, the network nodes 106 of the system 100 can lessen the chances of inter-cell PRS interference while allowing UEs 102 that would not experience such interference (e.g., UEs 102 relatively close to the network node 106 of a cell) to utilize a greater share of the PRS transmissions during location estimation relative to legacy solutions. As further stated above, the use of PRS transmission power patterns 112 in wireless communication systems can aid in verifying the identity of a source cell of particular PRS transmissions. FIG. 3 illustrates an example scenario in which such identification verification techniques could be utilized. In the figure, three network nodes 106A, 106B, and 106C transmit PRS series 110A, 110B, and 110C periodically (i.e., according to a particular frequency at which the PRS series is repeated) for separate cells associated with the network nodes.

In addition, the system 100 of FIG. 3 includes two UEs, UE 102A and 102B, each of which receive assistance data from a positioning server 108. This assistance data generally includes identifying information for the cells whose PRSs are to be measured by a UE 102A, 102B. In the sample embodiment of FIG. 3, the UE 102A receives assistance data indicating that the UE 102A, 102B is to generate and return PRS measurement data based on PRSs transmitted by cells of the network nodes 106A and 106C. This assistance data indicates the cells by including the CGI and PCI for both of these indicated cells—specifically, for the cell of network node 106A, a cell with a PCI of X is indicated, and for the cell of network node 106C, a cell with a PCI of Y is indicated.

Also present in the system 100, however, is an additional cell associated with network node 106B that has a PCI of Y (i.e., a same PCI of the cell of the network node 106C indicated in the assistance data), which also transmits PRSs in the system that are received by the UE 102A. In the system 100 of FIG. 3, obstructions 304 in the form of large buildings exist in the signal path between the cell of the network node 106C and the UE 102A, thereby rendering the PRSs 110C of the cell unreceivable by UE 102A. However, because no such obstructions exist for the PRSs 110B of network node 106B, based on the cell having a PCI of Y, the UE 102A could improperly assume that the source of PRSs 110B is the cell of network node 106C. This would lead, in those systems 100, to an inaccurate UE position estimation because it would be based on an inaccurate assumption regarding the source cell and its associated geographic location in and around the network node 110B.

Unlike legacy solutions, however, the techniques of the present disclosure include a method of verifying that the received PRSs truly were transmitted by a particular network node for a particular cell. Specifically, before the positioning server 108 performs a position estimation based on PRS measurement data (including received signal powers for the received PRSs) received from a UE 102, the positioning server 108 may cross-reference the received signal powers and/or their relative magnitudes with the PRS transmission power pattern 112 used by the cells from which the PRSs were to be received. If, based on this cross-referencing, the positioning server 108 determines that the relative magnitudes of the received PRSs do not match (within a particular range of difference to account for possible signal loss or other air-interface discrepancies), the positioning server 108 may determine that the measurement data is incorrect and may discard the information. Where such a discrepancy is discovered, the positioning server 108 may request that the UE 102 repeat the PRS measurements and the generation of the PRS measurement information and/or may change the assistance data until the measurements can be verified to ensure an accurate location estimate for the UE 102.

Figure 4:
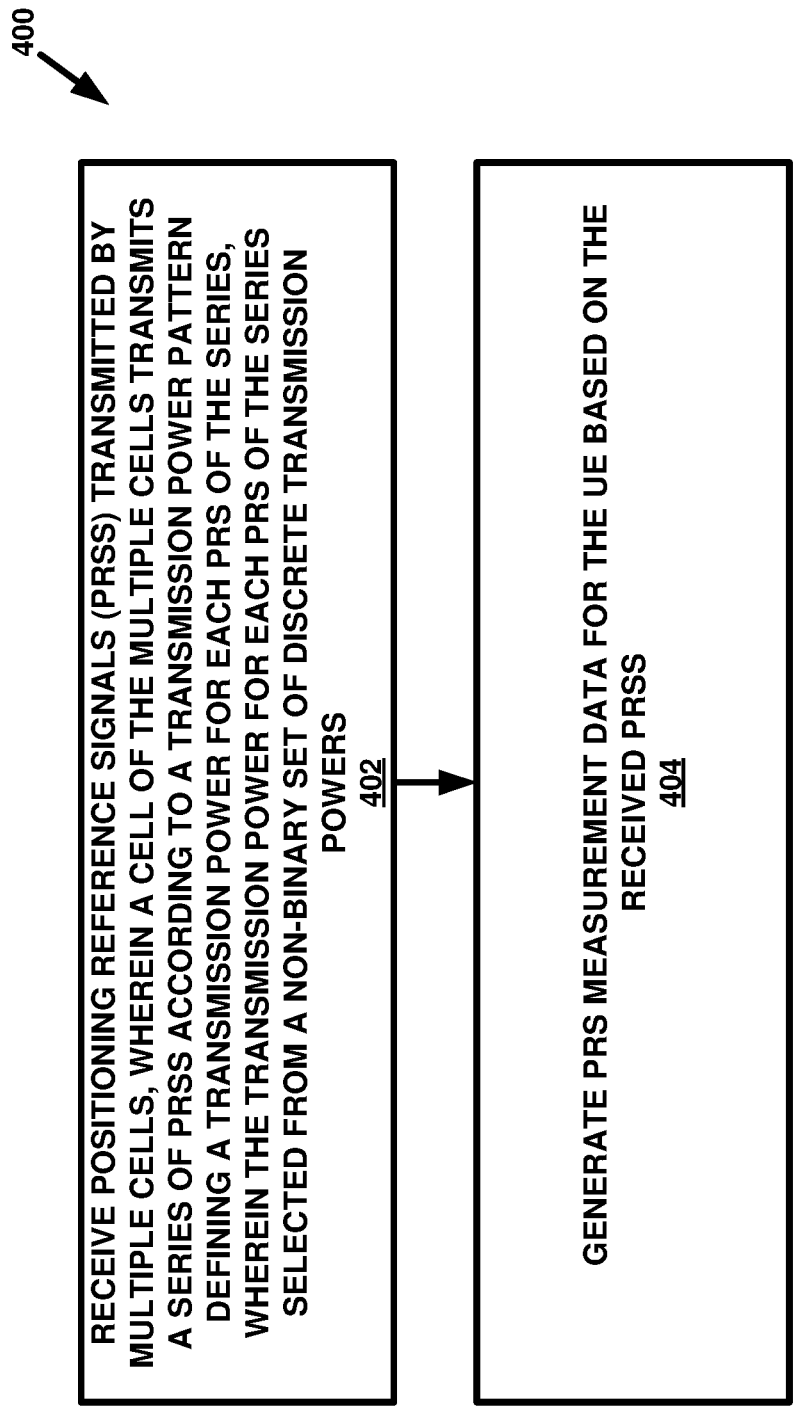
FIG. 4 illustrates a method performed by a UE according to one or more embodiments.
Figure 5:
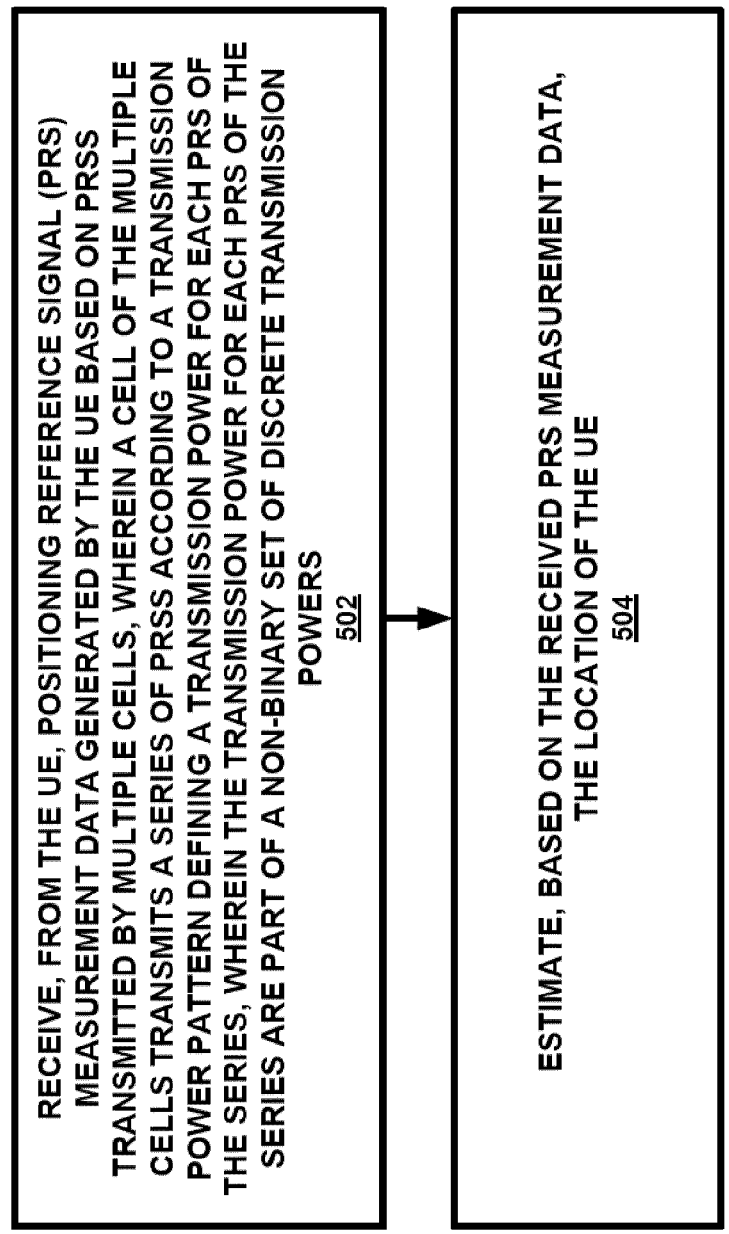
FIG. 5 illustrates a method performed by a positioning server according to one or more embodiments.
Figure 6:
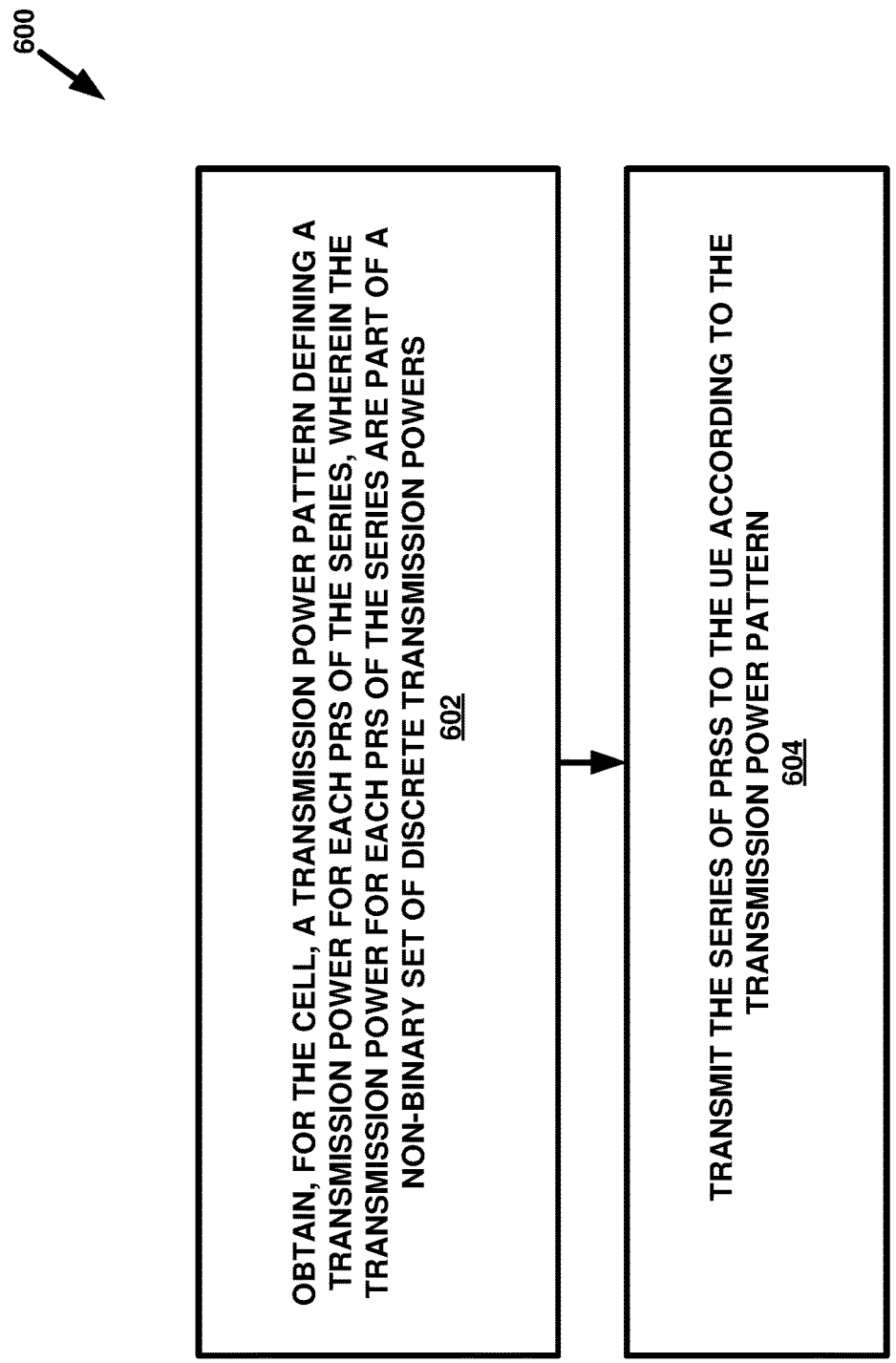
FIG. 6 illustrates a method performed by a network node according to one or more embodiments.

FIGS. 4-6 illustrate example methods for a UE, a positioning server, and a network node, respectively, according to the present disclosure. In FIGS. 4-6, the UE, the positioning server and the network node can correspond to the UE 102, the positioning server 108 and the network node 106 explained above. As will be discussed further below, although the example methods represent some embodiments of the disclosure, those exemplary embodiments are by no means limiting and should not be understood as such.

FIG. 4 presents an example method 400 executed by the UE 102 in a wireless communication system 100 for generating PRS measurement data based on received PRSs that are transmitted by network nodes 106 using one or more PRS transmission power patterns 112. For instance, the method 400 includes, at block 402, receiving these PRSs transmitted by multiple cells. As described above, a cell of the multiple cells may transmit a series of PRSs according to a transmission power pattern defining a transmission power for each PRS (i.e., PRS occasion, see FIG. 2) of the series. Furthermore, as also described above, the transmission power for each PRS of the series is selected from a non-binary set of allowable transmission powers. In a further aspect of method 400, at block 402, the UE can generate PRS measurement data for the UE based on the received PRSs.

In addition to the aspects of blocks 402 and 404 of FIG. 4, method 400 and other examples envisioned by the present disclosure may include further aspects that are not explicitly shown in FIG. 4. For instance, method 400 may also include the UE 102 transmitting the PRS measurement data to a positioning server 108, which may in turn utilize the measurement data received from the UE 102 to estimate a position (e.g., an absolute or relative geographic location) of the UE 102. In an aspect, the PRS measurement data can, in some embodiments, include a time of arrival difference between respective PRSs received from multiple cells, which may be utilized by the positioning server 108 to estimate a position or location of the UE 102.

Furthermore, before the UE 102 receives the PRSs at block 402, the UE 102 may receive assistance data transmitted by the network node 106 and originating from the positioning server 108. In an aspect, the assistance data may identify at least one cell for which PRS measurement is to be executed, as determined by the positioning server 108, for example. In some examples, the assistance data may additionally or alternatively include PRS transmission power pattern information for the at least one cell. Additionally, the PRS measurement data generated by the UE 102 may include a quality of reception associated with the one or more received PRSs (e.g., received signal power, signal-to-interference ratio, channel quality information, or any other metric indicative of signal quality of the PRSs). Using this PRS transmission power pattern information for the at least one cell and the quality of reception information, the UE 102 can compare the quality of reception of the received PRSs from a cell to the PRS transmission power pattern information to verify that the source cell for the received PRSs is a cell from which PRSs are to be measured. In other words, in some examples, the at least one cell is identifiable based at least in part on its transmission power pattern.

In addition, as discussed above, in some embodiments of method 400, the non-binary set of allowable transmission powers may be spaced evenly from zero power to a maximum transmission power of the network node 106. Also, the set of allowable transmission powers may include zero power and/or the maximum transmission power, or may include neither of these transmission power values.

FIG. 5 illustrates an example method 500, executed by a positioning server 108, for estimating a location of a UE 102 in a wireless communication system 100. In an aspect of method 500, the method may include, at block 502, receiving, from the UE, PRS measurement data generated by the UE based on PRSs transmitted by multiple cells. Furthermore, as discussed above, a cell of the multiple cells transmits a series of PRSs according to a transmission power pattern, which defines a transmission power for each PRS of the series. The transmission power for each PRS of the series may be selected from a non-binary set of allowable transmission powers.

In a further aspect of method 500, at block 504, the positioning server 108 may estimate the location of the UE based on the received PRS measurement data. This location estimation aspect of method 500 may include utilizing known locations of network nodes 106 associated with particular cells (e.g., those cells whose PRSs, as received at the UE, form the basis for the generated PRS measurement data) along with the PRS measurement data. In some examples, this PRS measurement data may include time-of-arrival data for one or more PRSs transmitted by one or more cells and/or quality of reception information (e.g., received signal power, etc.) for the PRSs received by the UE.

In addition to these aspects shown explicitly in FIG. 5, the method 500 may include additional or alternative features, such as those that follow. For instance, in a further aspect of method 500, the positioning server 108 may be configured to generate assistance data for the UE, the AD identifying multiple cells whose positioning reference signals are to be conducted by the UE, along with potentially additional information regarding the system or cells. Naturally, method 500 may include transmitting this assistance data to the UE.

Furthermore, as a network node 106 in some instances may generate and utilize an initial PRS transmission power pattern, the positioning server 108 may seek to obtain this initial PRS transmission power pattern (or an later PRS transmission power pattern of a network node 106 of which positioning server 108 does not have access to). As such, the method 500 may include, in some examples, obtaining, from a network node 106 associated with the cell, the transmission power pattern of the cell.

Moreover, the positioning server 108 is configured in some examples to alter one or more PRS transmission power patterns of one or more cells so as to minimize inter-cell interference and/or optimize UE usage of transmitted PRSs (e.g., based on UE positions or locations that may be known or accessibly by the positioning server 108). Accordingly, in some examples, method 500 may further include the positioning server 108 obtaining a PRS transmission power pattern that is, was, or will be in use by one or more cells.

Based on the obtained PRS transmission power pattern for a cell, the method 500 may also include generating an updated PRS transmission power pattern different from an obtained PRS transmission power pattern of the cell. In some example embodiments, generating the updated transmission power pattern by the positioning server 108 may be based on the received transmission power pattern of the cell, one or more other transmission power patterns of one or more other cells in the system, and/or a approximate location of one or more UEs in the system. This information is not an exclusive list of information that may be utilized by the positioning server 108 for generating an updated PRS transmission power pattern and allows the positioning server 108 to consider the likelihood of each of the one or more UEs receiving usable PRSs under a particular PRS transmission power pattern arrangement in the system. It also allows the UEs to weigh this reception likelihood along with the potential for inter-cell PRS interference during particular times in the system (i.e., during the allotted PRS occasion times, see FIG. 2). Accordingly, the method 500 may include determining that a particular cell or one or more other cells of the system cause interference, and based on such a determination, altering the received transmission power pattern to limit interference in the system.

Naturally, once the updated PRS transmission power pattern has been generated by the positioning server 108, it can be transmitted to the corresponding network node for implementation in the appropriate cell. In addition to the transmitting the updated PRS transmission power pattern itself, method 500 may include transmitting a request (or implicitly requesting, in some instances, by virtue of transmitting the updated PRS transmission power pattern) that the network node transmit PRSs to at least the UE using the updated transmission power pattern. Moreover, as some systems may include network nodes 106 that have access to the PRS transmission powers utilized by other network nodes in the system, method 500 may include the positioning server 108 transmitting the updated transmission power pattern to one or more other network nodes of the system (the one or more other network nodes being different than the network node for which the PRS transmission power pattern was updated).

In an additional optional feature of the method 500, the positioning server 108 can compare received PRS measurement data received from a UE to known PRS transmission power patterns utilized by cells whose PRSs serve as the basis for the measurement data, in order to verify that the correct PRSs serve as this basis. Accordingly, the method 500 may include, before estimating the position of the UE, performing such a comparison to determine whether the received signal powers of the PRSs (or relative values or a relative received power change between PRS occasions) received by the UE and included in the PRS measurement data resemble those of the known PRS transmission power patterns of the relevant cells. In some examples, determining whether these values "resemble" the known PRS transmission power pattern may include determining whether at least a certain number or percentage of the PRS occasions, or changes in received power therebetween, fall within a certain value range or a certain percentage change range. This allows for fluctuations in received PRS signal power due to less-than-ideal channel conditions for the PRS transmissions (i.e., interference, signal fading, obfuscation, and the like).

The method 500 may further include the positioning server 108 transmitting the estimated location of the UE to one or more other devices in a system. Such devices may include, but are not limited to, one or more network nodes, the UE whose position is estimated, a database storing such UE locations or other information related to position estimation, one or more other UEs of the system, and/or any other network or system devices. In some examples, a mobility management entity (MME) of the system 100 (not shown explicitly) may request the location of the UE, and the location, once estimated, may be transmitted to the MME.

In addition, as shown in FIG. 6, the present disclosure also details an example method 600 performed by a network node 106 for managing PRS transmission in a cell to one or more UEs. At block 602, method 600 includes obtaining, for the cell, a transmission power pattern defining a transmission power for each PRS of a series of PRSs. As described above in relation to other aspects, the transmission power for each PRS of the series may be selected from a non-binary set of allowable transmission powers. In some examples, obtaining the transmission power pattern includes generating the transmission power pattern at the network node 106, while in other examples, it may include receiving a transmission power pattern from another entity (e.g., the positioning server 106, a network data storage or a network server, or another network device) or reading a preconfigured transmission power pattern from a memory. In addition, method 600 may include, at block 604, transmitting the series of PRSs to the UE 102 according to the transmission power pattern obtained at block 602.

In addition to the features of blocks 602 and 604, the method 600 may include further aspects not explicitly shown in FIG. 6. For instance, where the transmission power pattern is generated at the network node 106, in some examples, such generation by the network node 106 may be based on position information corresponding to one or more UEs in the system (e.g., actual position, estimated position, approximate position, or the like), so as to reach an optimal number of UEs of the system with PRS transmissions. Additionally or alternatively, the transmission power pattern may be generated based on one or more transmission power patterns associated with one or more other cells of the system, for instance, to minimize inter-cell interference and/or to reach the optimal number of UEs of the system with the PRS transmissions of the cell and/or the one or more other cells.

Furthermore, in some embodiments, the method 600 may include informing the positioning server 108 of the PRS transmission power pattern that is used by the network node 106. As such, in some instances, method 600 may include receiving a request message from a positioning server where the request message requests the network node to identify the transmission power pattern being utilized by the network node. Accordingly, the network node 106 can provide the transmission power pattern to the positioning server. As the positioning server 108 is configured, in some examples, to alter the transmission power pattern used by the network nodes 106, method 600 may also include receiving an updated transmission power pattern from the positioning server in response to providing the transmission power pattern. Furthermore, method 600 may include the network node 106 utilizing the updated transmission power pattern for transmitting PRSs based on receiving the updated transmission power pattern from the positioning server 108.

Figure 7B:
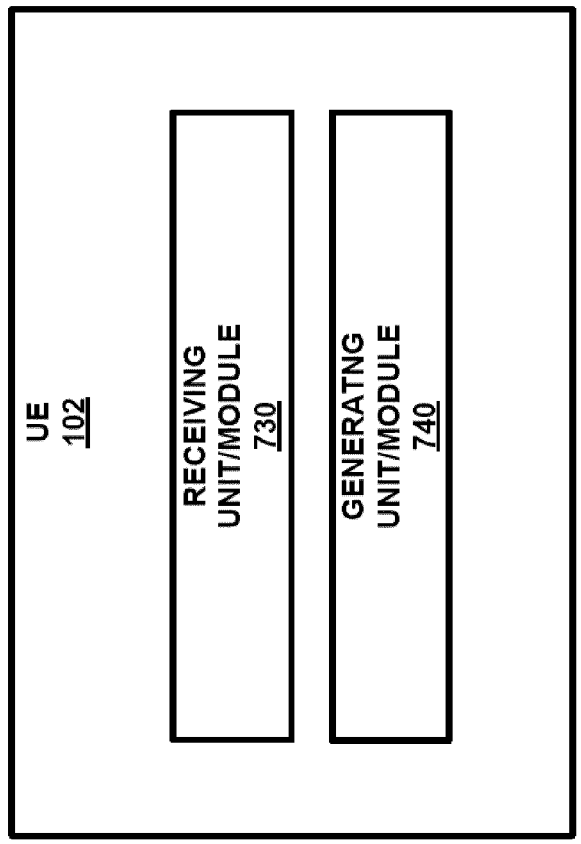
FIGS. 7A and 7B illustrate aspects of an example UE according to embodiments of the present disclosure.
Figure 7A:
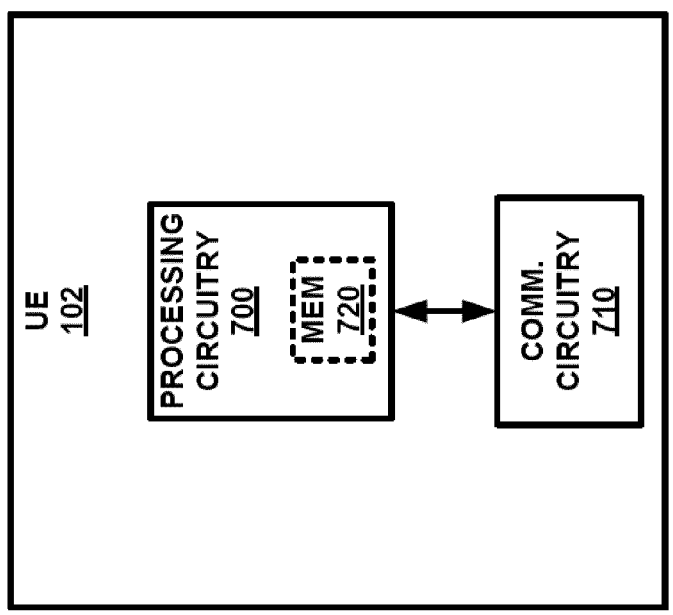

FIG. 7A illustrates a UE 102 implemented in accordance with one or more embodiments. The UE 102 may correspond to the UE 102 described above in connection with FIGS. 1 to 6. As shown, the UE 102 includes processing circuitry 700 and communication circuitry 710. The communication circuitry 710 is configured to transmit and/or receive information to and/or from one or more network nodes 106 via any communication technology. Such communication may occur via one or more antennas that are either internal or external to the UE 102. For example, the communication circuitry may comprise a transceiver circuitry and one or more antennas. The processing circuitry 700 is configured to perform processing described above, e.g., in FIGS. 1-4, such as by executing instructions stored in a memory 720. The processing circuitry 700 in this regard may implement certain functional means, units, or modules.

FIG. 7B illustrates a UE 102 implemented in accordance with one or more other embodiments. The UE 102 may correspond to the UE 102 described above in connection with FIGS. 1 to 6. As shown, the UE 102 implements various functional means, units, or modules, e.g., via the processing circuitry 700 in FIG. 7A and/or via software code. These functional means, units, or modules, e.g., for implementing the method 400 in FIG. 7, include for instance a receiving unit or module 730 for receiving positioning reference signals transmitted by multiple cells. Also included is a generating unit or module 740 for generating PRS measurement data for the UE based on the PRSs. In addition, although not explicitly shown in FIG. 7B, UE 102 can include other units or modules for performing any of the other functions of the UE 102 described herein.

Figure 8B:
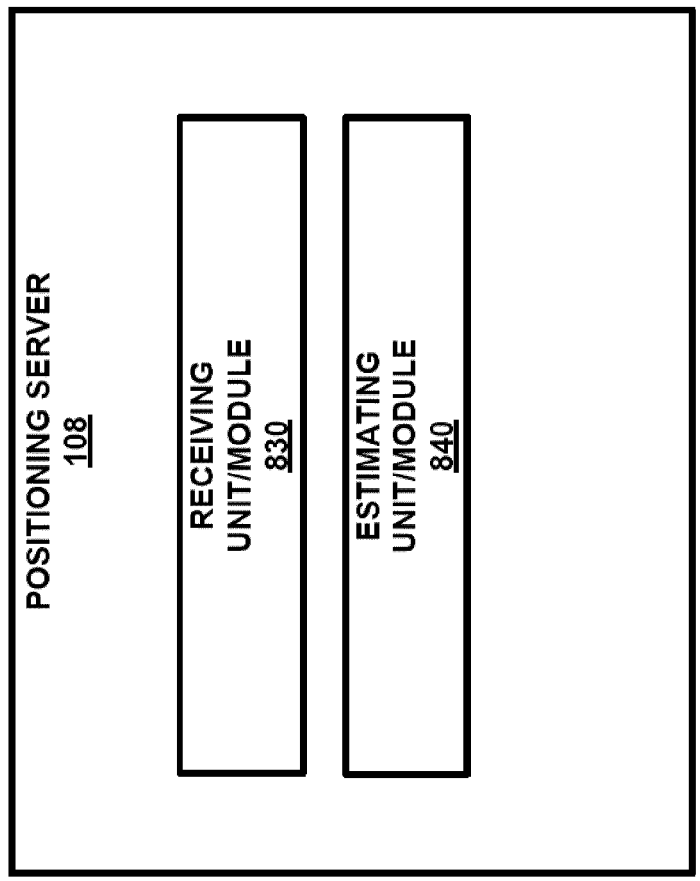
FIGS. 8A and 8B illustrate aspects of an example positioning server according to embodiments of the present disclosure.
Figure 8A:
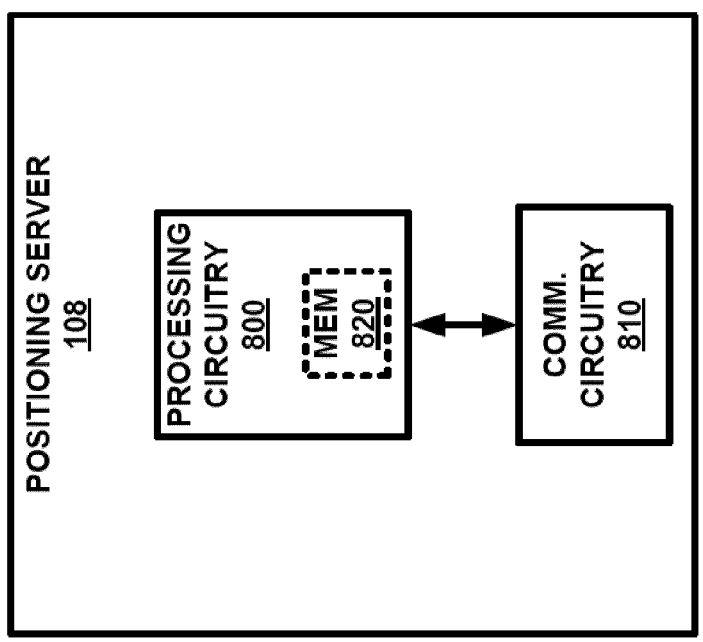

FIG. 8A illustrates a positioning server 108 implemented in accordance with one or more embodiments. The positioning server 108 may correspond to the positioning server 108 described above in connection with FIGS. 1 to 6. As shown, the positioning server 108 includes processing circuitry 800 and communication circuitry 810. The communication circuitry 810 is configured to transmit and/or receive information to and/or from one or more network nodes 106 via any communication technology. Such communication can occur over a cable or other "wired" connection, although the communication may occur via one or more antennas that are either internal or external to the positioning server 108. For example, the communication circuitry may comprise a transceiver circuitry and one or more antennas. The processing circuitry 800 is configured to perform processing described above, e.g., in FIGS. 1-3 and 5, such as by executing instructions stored in a memory 820. The processing circuitry 800 in this regard may implement certain functional means, units, or modules.

FIG. 8B illustrates a positioning server 108 implemented in accordance with one or more other embodiments. The positioning server 108 may correspond to the positioning server 108 described above in connection with FIGS. 1 to 6. As shown, the positioning server 108 implements various functional means, units, or modules, e.g., via the processing circuitry 800 in FIG. 8A and/or via software code. These functional means, units, or modules, e.g., for implementing the method 500 in FIG. 5, include for instance a receiving unit or module 830 for receiving PRS measurement data generated by a UE. Also included is an estimating unit or module 840 for estimating, based on the received PRS measurement data, the location of the UE. In addition, although not explicitly shown in FIG. 8B, positioning server 108 can include other units or modules for performing any of the other functions of the positioning server 108 described herein.

Figure 9B:
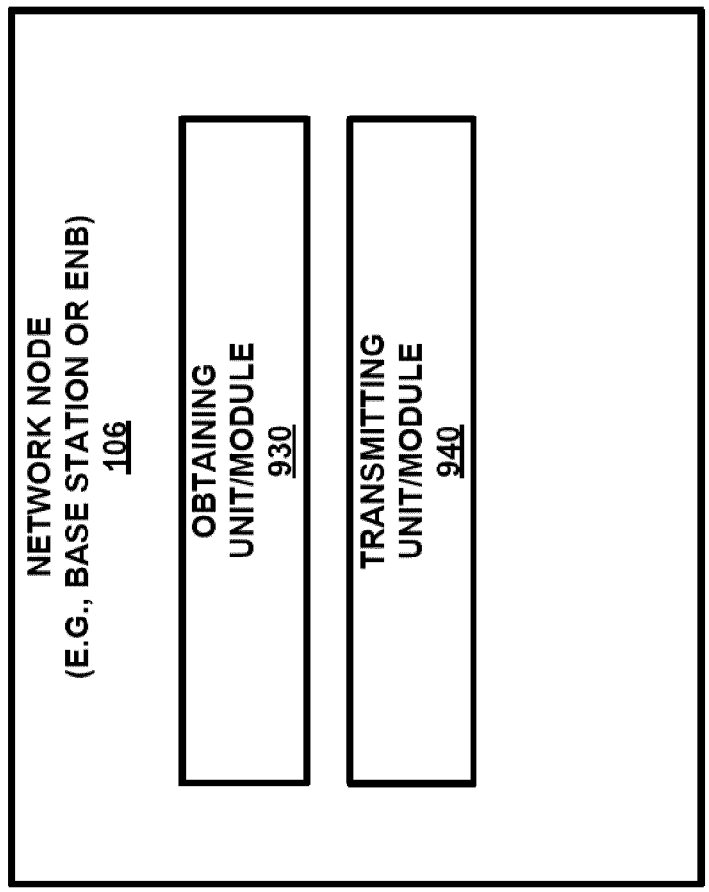
FIGS. 9A and 9B illustrate aspects of an example network node according to embodiments of the present disclosure.
Figure 9A:
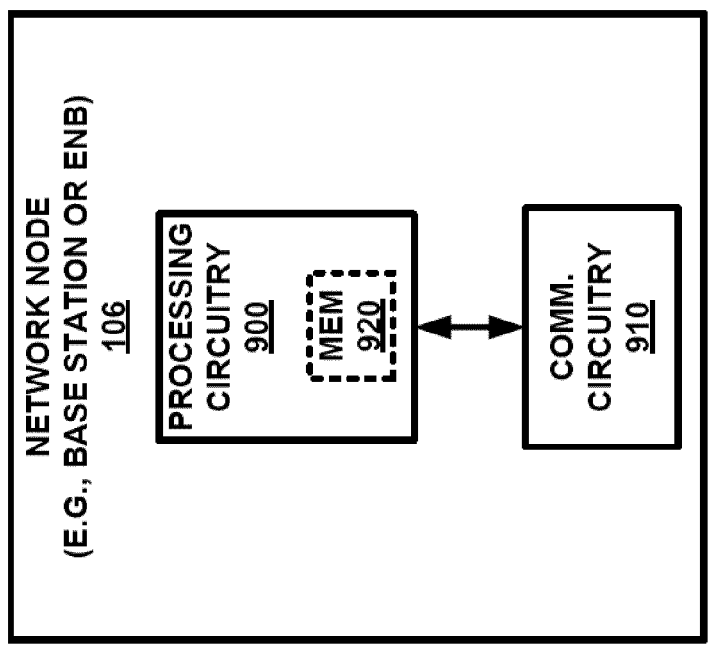

FIG. 9A illustrates a network node 106 implemented in accordance with one or more embodiments. The network node 106 may correspond to the network node 106 described above in connection with FIGS. 1 to 6. As shown, the network node 106 includes processing circuitry 900 and communication circuitry 910. The communication circuitry 910 is configured to transmit and/or receive information to and/or from one or more network nodes 106 via any communication technology. Such communication may occur via one or more antennas that are either internal or external to the network node 106. For example, the communication circuitry may comprise a transceiver circuitry and one or more antennas. The processing circuitry 900 is configured to perform processing described above, e.g., in FIGS. 1-3 and 6, such as by executing instructions stored in a memory 920. The processing circuitry 900 in this regard may implement certain functional means, units, or modules.

FIG. 9B illustrates a network node 106 implemented in accordance with one or more other embodiments. The network node 106 may correspond to the network node 106 described above in connection with FIGS. 1 to 6. As shown, the network node 106 implements various functional means, units, or modules, e.g., via the processing circuitry 900 in FIG. 9A and/or via software code. These functional means, units, or modules, e.g., for implementing the method 500 in FIG. 5, include for instance an obtaining unit or module 930 for obtaining, for a cell, a transmission power pattern for transmitting a series of PRSs. Also included is a transmitting unit or module 940 transmitting the series of PRSs to the UE according to the transmission power pattern. In addition, although not explicitly shown in FIG. 9B, network node 106 can include other units or modules for performing any of the other functions of the network node 106 described herein.

A network node 106 herein is any type of network node (e.g., a base station, nodeB, eNB, access point) capable of communicating with one or more UEs over a wireless communication link, with other network nodes 106 over a communication interface (e.g, the X2 interface in LTE), and/or with a positioning server 108. UE 102 is any type device capable of communicating with a network node 106 over radio channels. UE 102 may also be referred to as a radio device, a radio communication device, a wireless terminal, or simply a terminal, and may include device-to-device UEs, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be UEs, but are generally configured to transmit and/or receive data without direct human interaction. In addition, the positioning server 108 of the disclosure may be an Evolved Serving Mobile Location Center (E-SMLC), Gateway Mobile Location Centre (GMLC), or any other device or server configured to provide positioning services.

Furthermore, the communication between certain entities in the present disclosure may be carried out according to particular standards. For instance, communication between the positioning server 108 and UEs 102 may follow the LTE Positioning Protocol (LPP) as disclosed in Third Generation Partnership Project (3GPP) Technical Specification (TS) 36.355, Version 14.0.0, December 2016. Communication between the positioning server 108 and the network nodes 106 may follow the LPPa protocol of 3GPP TS 36.455, Version 14.0.0, January 2017. These specific standardized communication protocols, however, are not necessary for any of the embodiments described herein, and therefore other forms of communication between these entities may be utilized and remain within the scope of the present disclosure.

The methods and entities mentioned described above may be implemented in software, hardware or a combination thereof. Those skilled in the art will also appreciate that embodiments herein further include corresponding computer programs. A computer program comprises instructions which, when executed on at least one processor of a node, cause the node to carry out any of the respective processing described above. A computer program in this regard may comprise one or more code modules corresponding to the means or units described above. Embodiments further include a carrier comprising such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of a network node or control node, cause the node to perform as described above. Embodiments further include a computer program product comprising program code portions for performing the steps of any of the embodiments herein when the computer program product is executed by a computing device. This computer program product may be stored on a computer readable recording medium.

Furthermore, the processing or functionality of network node 106 may be considered as being performed by a single instance or device or may be divided across a plurality of instances of network node 106 that may be present in a given network or environment such that together the device instances perform all disclosed functionality. In addition, network node 106 may be any known type of device associated with a wireless communication network, radio communication network, or content delivery network, generally, that is known to perform a given disclosed processes or functions thereof. Examples of such network nodes include eNBs (or other types of base stations or access points), Mobility Management Entities (MMEs), gateways, servers, one or more processors and memories, and the like. Processors that may be used include general purpose processors like CPUs and specialized or dedicated processors like NPUs (network processing units).

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, executed by a positioning server, for estimating a location of a user equipment (UE) in a wireless communication system, the method comprising:
    receiving, from the UE, positioning reference signal (PRS) measurement data generated by the UE based on PRSs transmitted by at least one of two or more cells with the same cell identifier, wherein each of the two or more cells transmits a series of PRSs according to a different transmission power pattern defining a transmission power for each PRS of the series, wherein the transmission power for each PRS of the series are part of a non-binary set of allowable transmission powers;
    identifying the at least one cell of the two or more cells based on a transmission power pattern of the PRSs transmitted by the at least one cell of the two or more cells; and
    estimating, based on the received PRS measurement data and a location associated with the at least one cell, the location of the UE.

2. The method of claim 1, further comprising obtaining, from a network node associated with the cell, the transmission power pattern of the at least one cell of the two or more cells.

3. The method of claim 1, further comprising:
    generating an updated transmission power pattern different from the transmission power pattern of the at least one cell of the two or more cells; and
    transmitting the updated transmission power pattern to the network node for implementation by the at least one cell of the two or more cells.

4. The method of claim 3, wherein the generating the updated transmission power pattern comprises:
    determining that the at least one cell of the two or more cells or one or more other cells of the system cause interference; and
    altering the transmission power pattern of the at least one cell of the two or more cells, responsive to determining that the at least one cell of the two or more cells or one or more other cells cause interference.

5. The method of claim 1, further comprising:
    generating assistance data (AD) for the UE, the AD identifying multiple cells whose positioning reference signals are to be conducted by the UE; and
    transmitting the AD to the UE.

6. The method of claim 1, wherein the non-binary set of allowable transmission powers are spaced evenly from zero power to a maximum transmission power of the network node.

7. A positioning server configured to estimate a location of a user equipment (UE) in a wireless communication system, the positioning server comprising:
    communication circuitry configured to exchange signals with the UE; and
    processing circuitry communicatively coupled to the communication circuitry and operative to control the positioning server such that the positioning server is configured to:

receive, from the UE, positioning reference signal (PRS) measurement data generated by the UE based on PRSs transmitted by at least one of two or more cells with the same cell identifier, wherein each of the two or more cells transmits a series of PRSs according to a different transmission power pattern defining a transmission power for each PRS of the series, wherein the transmission power for each PRS of the series are part of a non-binary set of allowable transmission powers;

identify the at least one cell of the two or more cells based on a transmission power pattern of the PRSs transmitted by the at least one cell; and estimate, based on the received PRS measurement data and a location associated with the at least one cell of the two or more cells, the location of the UE.

8. The positioning server of claim 7, wherein the positioning server is configured to obtain, from a network node associated with the cell, the transmission power pattern of the at least one cell of the two or more cells.

9. The positioning server of claim 7, wherein the positioning server is configured to:

generate an updated transmission power pattern different from the transmission power pattern of the at least one cell of the two or more cells; and transmit the updated transmission power pattern to the network node for implementation by the at least one cell of the two or more cells.

10. The positioning server of claim 9, wherein the positioning server is configured to generate the updated transmission power pattern by:

determining that the at least one cell of the two or more cells or one or more other cells of the system cause interference; and altering the received transmission power pattern of the at least one cell of the two or more cells, responsive to determining that the at least one cell of the two or more cells or one or more other cells cause interference.

11. The positioning server of claim 7, wherein the positioning server is configured to:

generate assistance data (AD) for the UE, the AD identifying multiple cells whose positioning reference signals are to be conducted by the UE; and transmit the AD to the UE.

12. The positioning server of claim 7, wherein the non-binary set of allowable transmission powers are spaced evenly from zero power to a maximum transmission power of the network node.

13. A method, executed by a network node, for managing transmission of Positioning Reference Signals (PRSs) in a cell to a user equipment (UE) in a wireless communication system, the method comprising:

obtaining, by the network node, a transmission power pattern for a first one of two or more cells having the same cell identifier, the transmission power pattern defining a transmission power for each PRS of the series and being unique among the two or more cells with the same cell identifier to enable disambiguation of PRSs transmitted by the two or more cells with the same cell identifier, the transmission power for each PRS of the series being selected from a non-binary set of allowable transmission powers; and transmitting the series of PRSs to the UE according to the transmission power pattern.

14. The method of claim 13, wherein the obtaining the transmission power pattern comprises generating the transmission power pattern at the network node.

15. The method of claim 13, wherein the obtaining the transmission power pattern comprises:

receiving a request message from a positioning server, the request message requesting the network node to identify the transmission power pattern being utilized by the network node;

providing the transmission power pattern to the positioning server;

receiving an updated transmission power pattern from the positioning server in response to providing the transmission power pattern; and utilizing the updated transmission power pattern for transmitting PRSs based on receiving the updated transmission power pattern.

16. The method of claim 13, wherein the non-binary set of allowable transmission powers are spaced evenly from zero power to a maximum transmission power of the network node.

17. A network node for managing transmission of Positioning Reference Signals (PRSs) in a cell to a user equipment (UE) in a wireless communication system, the network node comprising:

communication circuitry configured to exchange signals with the UE; and processing circuitry communicatively coupled to the communication circuitry and operative to control the network node such that the network node is configured to:

obtain, by the network node, a transmission power pattern for a first one of two or more cells having the same cell identifier, the transmission power pattern defining a transmission power for each PRS of the series and being unique among the two or more cells with the same cell identifier to enable disambiguation of PRSs transmitted by the two or more cells with the same cell identifier, the transmission power for each PRS of the series being selected from a non-binary set of allowable transmission powers; and transmit the series of PRSs to the UE according to the transmission power pattern.

18. The network node of claim 17, wherein the network node is configured to obtain the transmission power pattern by generating the transmission power pattern at the network node.

19. The network node of claim 17, wherein the network node is configured to:

obtain the transmission power pattern by:

receiving a request message from a positioning server, the request message requesting the network node to identify the transmission power pattern being utilized by the network node;

providing the transmission power pattern to the positioning server;

receiving an updated transmission power pattern from the positioning server in response to providing the transmission power pattern; and utilize the updated transmission power pattern for transmitting PRSs based on receiving the updated transmission power pattern.

20. The network node of claim 17, wherein the non-binary set of allowable transmission powers are spaced evenly from zero power to a maximum transmission power of the network node.

* * * * *